(No Model.) 2 Sheets—Sheet 1.
N. S. C. PERKINS.
Velocipede.
No. 231,609. Patented Aug. 24, 1880.
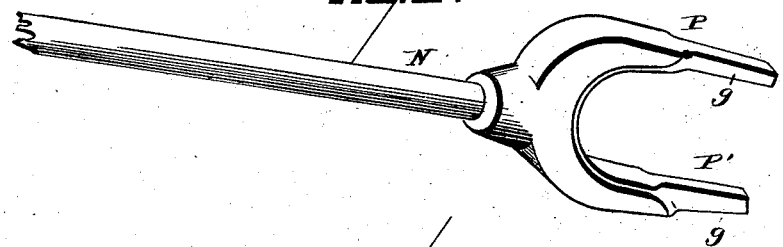
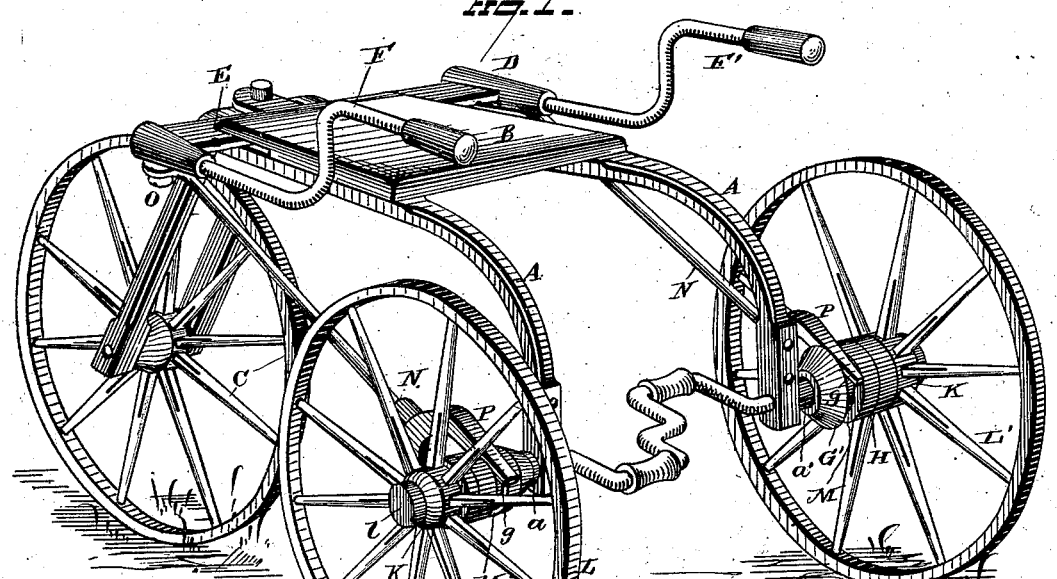
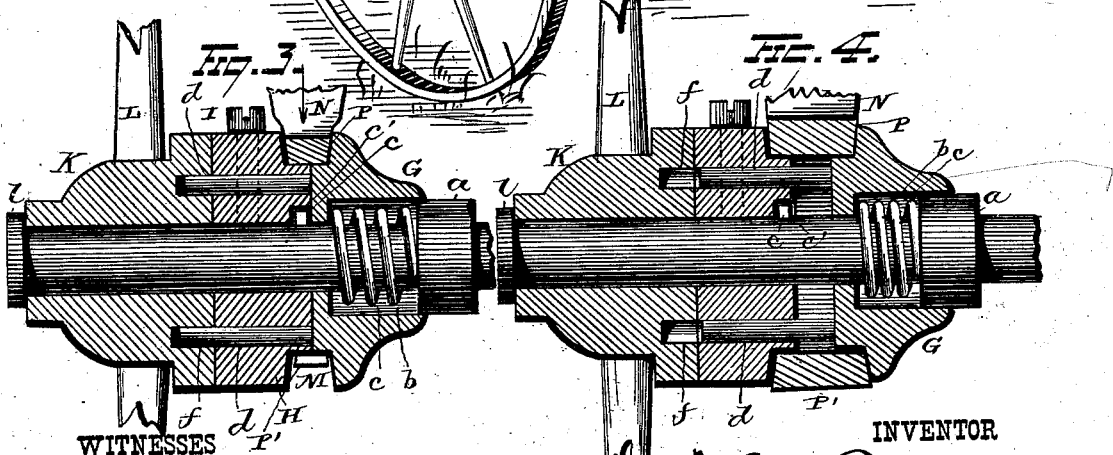
WITNESSES
E. J. Nottingham
F. O. McCleary
INVENTOR
N. S. C. Perkins.
By H. A. Seymour.
ATTORNEY (No Model.) 2 Sheets—Sheet 2.
N. S. C. PERKINS.
Velocipede.
No. 231,609. Patented Aug. 24, 1880.
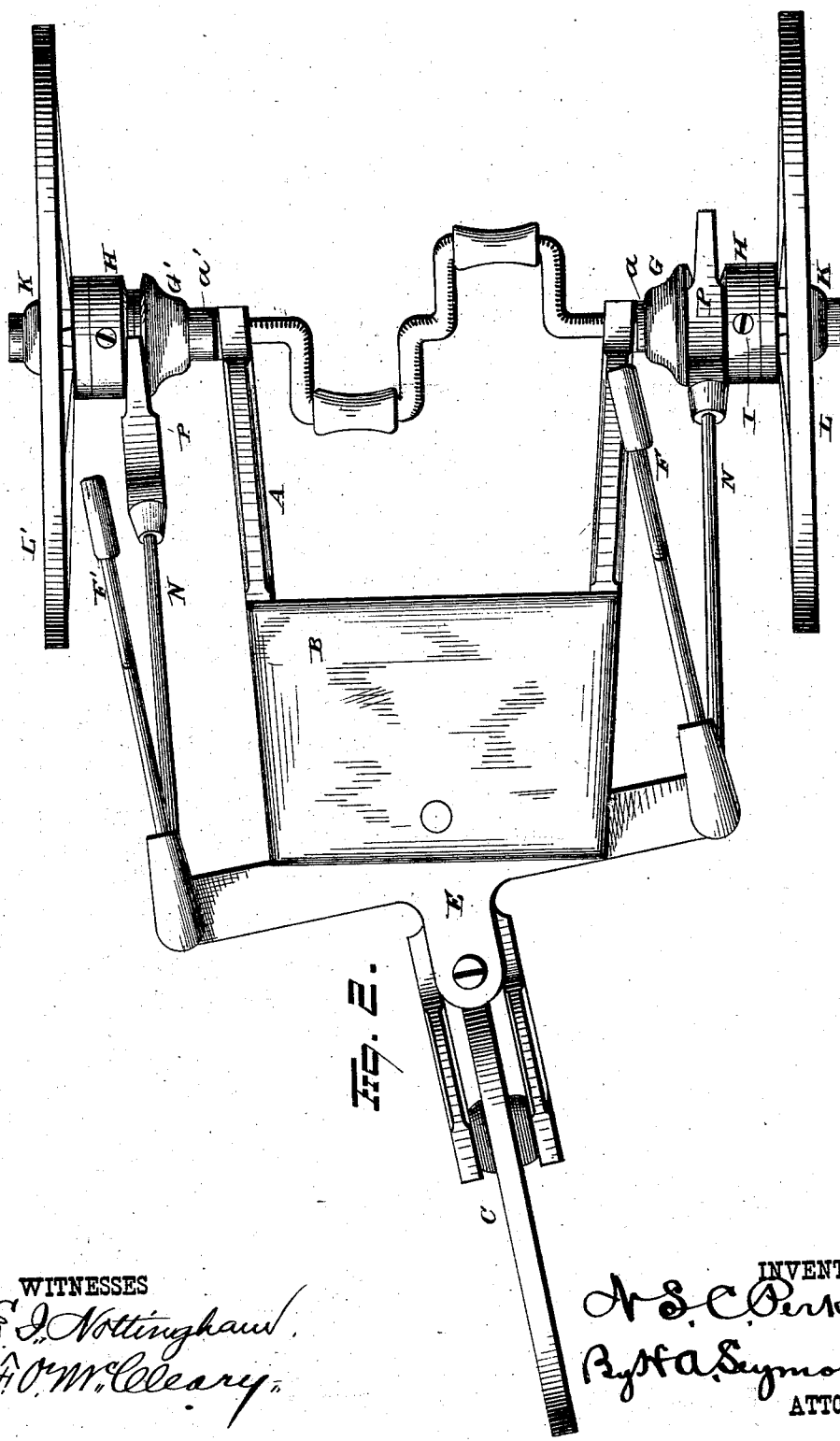
WITNESSES
E. I. Nottingham
F. O. McCleary
INVENTOR
N. S. C. Perkins
By H. A. Seymour.
ATTORNEY

UNITED STATES PATENT OFFICE.

NAHUM S. C. PERKINS, OF NORWALK, OHIO.

VELOCIPEDE.

SPECIFICATION forming part of Letters Patent No. 231,609, dated August 24, 1880.

Application filed March 8, 1880. (No model.)

*To all whom it may concern:*

Be it known that I, NAHUM S. C. PERKINS, of Norwalk, in the county of Huron and State of Ohio, have invented certain new and useful Improvements in Velocipedes; and I do hereby declare the following to be a full, clear, and exact description of the invention, such as will enable others skilled in the art to which it pertains to make and use it, reference being had to the accompanying drawings, which form part of this specification.

My invention relates to an improvement in velocipedes, the object being to make provision for causing the wheel on the inner and smaller circle described by the velocipede to be automatically disengaged from the crank-shaft as the guide-wheel is turned, and thereby permit the velocipede to be readily turned without undue friction or strain on the wheels or crankshaft, the wheel on the inner and smaller circle serving as an idler, while the wheel on the outer or larger circle is locked fast to the crankshaft, thereby serving as the propelling-wheel in describing a circle.

To this end my invention consists in the combination, with suitable clutches on the crank-shaft of a velocipede for locking the wheels rigidly to the crank-shaft, of shipperrods attached at their rear ends to the opposite ends of the oscillating arm, with which the steering-handles are connected, the opposite ends of said shipper-rods being connected with the clutches in such a manner that when the velocipede describes a circle the outer wheel will remain locked fast to the crank-shaft, while the inner wheel will be automatically disengaged from the crank and revolve independently thereof.

My invention further consists in certain details of construction and combinations of parts, as will hereinafter be described, and pointed out in the claims.

In the accompanying drawings, Figure 1 is a view, in perspective, of a velocipede embodying my invention. Fig. 2 is a plan view, showing the velocipede describing a circle, the outer wheel being locked to the crank-shaft and the inner wheel being disengaged therefrom. Fig. 3 is a detached view, in vertical section, of the hub of one of the wheels and the clutch and fingers of the shipper-rod, showing the wheel locked to the crank-shaft. Fig. 4 is a similar view, showing the wheel disengaged from the crank-shaft; and Fig. 5 is a detached view of the fingers of the shipper-rod.

A represents the frame, and B the seat, of a three-wheeled velocipede. C is the guidewheel, and D the guiding mechanism. A detailed description of the guiding mechanism is unnecessary in this patent, as said parts are fully shown in Letters Patent No. 223,421, granted to me January 6, 1880, and form no part of this improvement.

Further, my improvement in question may be applied to velocipedes provided with different forms of guiding mechanism, and hence I would have it understood that I do not limit myself to its application to a velocipede provided with any particular form of guiding mechanism.

To the opposite ends of the oscillating or swinging guide-bar E are rigidly secured the guide-handles F F', the attachment being made in any desired manner.

By moving the handles laterally in either direction the rider may turn the guide-wheel either to the right or left, and thus turn the velocipede in any desired direction or curve.

The opposite ends of the crank-shaft are provided with collars $a$ $a'$ and with sliding clutches G G', the latter being furnished with recesses $b$ for the reception of springs $c$. One end of the spring $c$ rests against the collar $a$ and its other end against the clutch G; hence it will be observed that the springs serve to move the clutches outwardly or toward the wheel. Each clutch is provided with any desired number of pins $d$, which pass through holes in the collar H, the latter being made fast to the spindle of the crank-shaft by means of a set-screw, I, or other suitable device. The collar is further secured against rotary movement on the spindle by means of a pin or lug secured to the spindle of the crank-shaft, said pin or stud entering a recess, $c'$, in the collar, and preventing the latter from rotary displacement.

The hubs K of the crank-shaft wheels L L' are secured upon the spindles by screws $l$, or in any other manner desired. The inner faces of the hubs are formed with any number of pockets or holes $f$, into which the ends of the pins $d$ enter, and thus lock the wheel to the collar H, thereby causing the wheel to turn with the crank-shaft. The adjacent ends of the collars H and sliding clutch G G' are grooved to form an annular groove, M.

Shipper-rods N are pivoted at their rear ends, by bolts or screws O, to the opposite ends of the guide-bar E, the opposite ends of each shipper-rod being provided with the fingers P P', which fit into the annular groove M, and thus embrace the opposite sides of the stationary collar and sliding clutch. Fingers P P' are made tapering from their outer ends rearward, or, in other words, are wedge-shaped.

When the velocipede is traveling straight forward or backward the narrow portions $g$ of the fingers engage in the groove M, and thus both wheels of the crank-shaft remain locked thereto, the springs acting against the sliding clutches to retain the pins secured thereto in engagement with the wheels. When the guide-bar E is turned either to the right or left, by moving the guiding-handles laterally, and thus the guide-wheel shifted to cause the velocipede to describe a circle, the shipper-rods on the outer side of the curve will be moved away from the crank-shaft, and thus not disturb the clutch mechanism, and allow the wheel on the outer side of the curve to remain locked fast to the crank-shaft, while its shipper-rod on the inside of the curve will be forced toward the crank-shaft, and cause the wedge-shaped fingers to force the sliding clutch away from the collar next to the wheel-hub, and thus withdraw the clutch-pins from the hub, thereby freeing the wheel from its axle. Thus the inner wheel is loose on the crank-shaft, and the outer wheel fast thereto, when the velocipede is made to describe a curve in either direction.

A velocipede provided with my improvement can be readily and easily turned within a large or small circle, and when running forward or backward in a straight line the wheels are automatically locked to the crank-shaft.

It is evident that many slight changes in the form and construction of the clutch mechanism and the shipper-rods might be resorted to without departing from the spirit of my invention, and hence I would have it understood that I do not restrict myself to the exact construction and relative arrangement of parts shown and described; but, Having fully described my invention, what I claim as new, and desire to secure by Letters Patent, is—

1. In a velocipede, the combination, with the crank-shaft and wheels connected therewith, of clutch mechanism on opposite ends of the crank-shaft, and shipper-rods pivoted at one end to the guiding mechanism and engaging at their opposite ends with said clutch mechanism, whereby the velocipede when describing a curve will have its outer wheel locked to the crank-shaft and its inner wheel automatically disengaged therefrom, substantially as set forth.

2. In a three-wheeled velocipede, the combination, with sliding clutches on the opposite ends of the crank-shaft for locking the wheels thereto, of shipper-rods provided with fingers which engage with said clutch mechanism, the opposite ends of the shipper-rods being pivoted to the guide-bar, substantially as set forth.

3. In a velocipede, the combination, with sliding clutches on the opposite ends of its crank-shaft, of shipper-rods provided with wedge-shaped fingers which engage with said clutches, the ends of the shipper-rods being pivoted to the guiding mechanism, substantially as set forth.

In testimony that I claim the foregoing I have hereunto set my hand this 26th day of February, 1880.

NAHUM SIMEON CARY PERKINS.

Witnesses:
C. W. FLINN,
WILLIE DEAT.